(12) United States Patent
Showcatally et al.

(10) Patent No.: US 7,510,422 B2
(45) Date of Patent: Mar. 31, 2009

(54) ANTENNA BREAKAWAY DEVICE FOR UTILITY PIT METER SYSTEM

(75) Inventors: Shawn Showcatally, Mankato, MN (US); Aaron Fitzgerald, Medford, MN (US); Ken Rigdon, Mapleton, MN (US); Brad D. Pedersen, Minneapolis, MN (US)

(73) Assignee: Itron, Inc., Spokane, WA (US)

( * ) Notice: Subject to any disclaimer, the term of this patent is extended or adjusted under 35 U.S.C. 154(b) by 407 days.

(21) Appl. No.: 11/381,487

(22) Filed: May 3, 2006

(65) Prior Publication Data
US 2007/0270012 A1 Nov. 22, 2007

(51) Int. Cl.
*G08B 23/00* (2006.01)
(52) U.S. Cl. .................................. 439/474; 340/870.02
(58) Field of Classification Search .................. 439/474, 439/923; 340/870.02; 343/719
See application file for complete search history.

(56) References Cited

U.S. PATENT DOCUMENTS

| | | | | |
|---|---|---|---|---|
| 4,463,354 A | * | 7/1984 | Sears | 340/870.02 |
| 6,162,082 A | * | 12/2000 | Karsten et al. | 439/318 |
| 6,414,605 B1 | * | 7/2002 | Walden et al. | 340/870.02 |
| 7,033,193 B2 | * | 4/2006 | Higgins et al. | 439/277 |
| 7,283,063 B2 | * | 10/2007 | Salser, Jr. | 340/870.02 |
| 2006/0218104 A1 | * | 9/2006 | Johnson et al. | 705/412 |

* cited by examiner

*Primary Examiner*—Neil Abrams
(74) *Attorney, Agent, or Firm*—Patterson, Thuente, Skaar & Christensen, P.A.

(57) ABSTRACT

Breakaway devices for use in a meter-pit environment that protect connections between components of an AMR system are described herein. In various embodiments, at least one cable is adapted to operably couple a first AMR device and a second AMR device, wherein at least one of the first AMR device and the second AMR device is disposed in a utility meter pit. In an embodiment, at least once connector adapted to operably couple the cable to the first AMR device or the second AMR device is constructed to be decoupleabe in response to a force that is less than the linear breaking strength of the cable. In another embodiment, the cable may be constructed to have a length equal to at least about twice the distance between the first AMR device and the second AMR device. A coupling member is provided that secures a portion of the cable in a generally coiled configuration, and the coupling member is constructed to be decouplable to release a portion of the length of the cable in the generally coiled configuration in response to a force that is less than the linear breaking strength of the cable. The systems and devices disclosed herein act to prevent overstress on system components and connections when force is applied to the cable connecting these components.

10 Claims, 7 Drawing Sheets

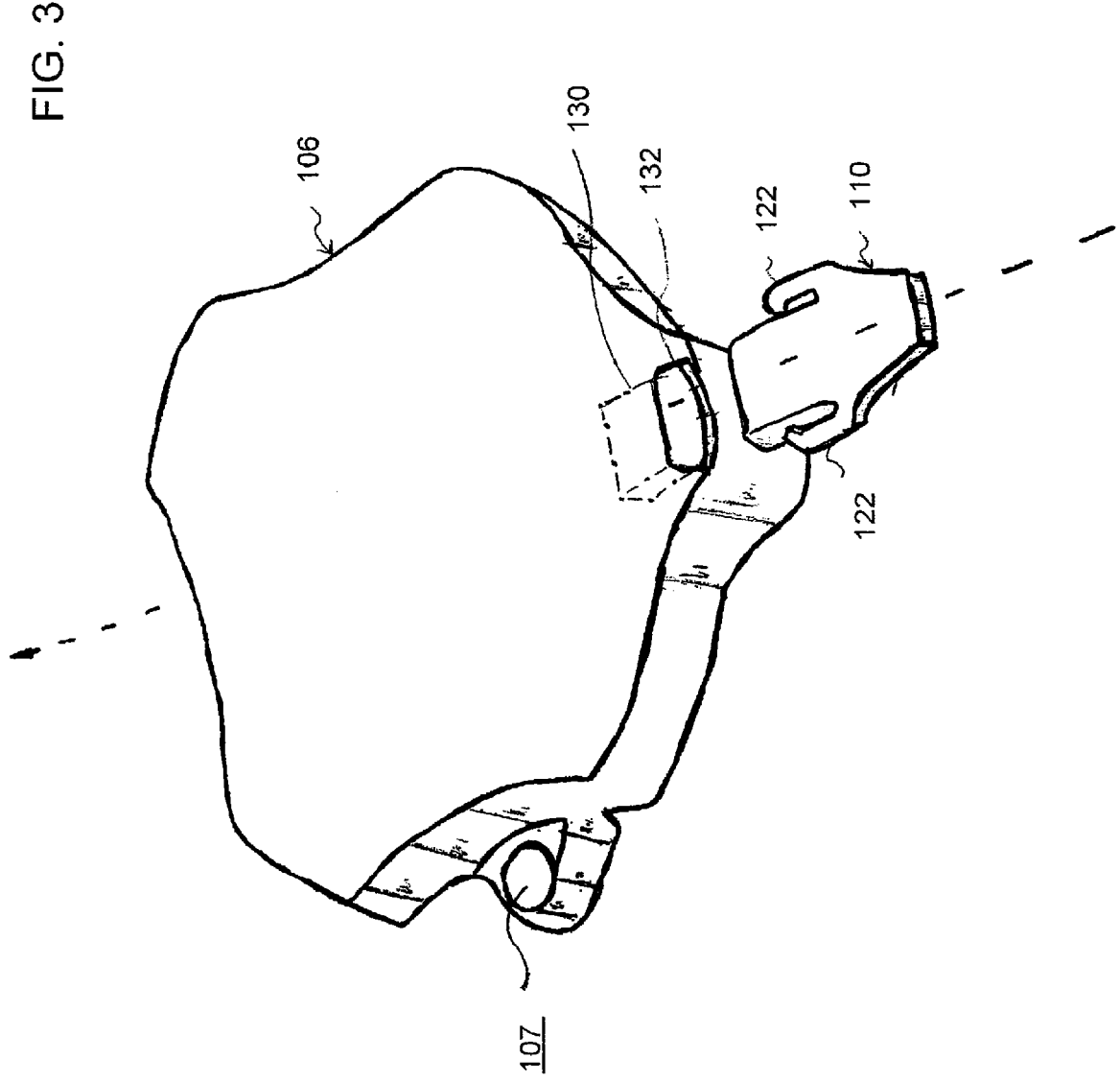

FIG. 4
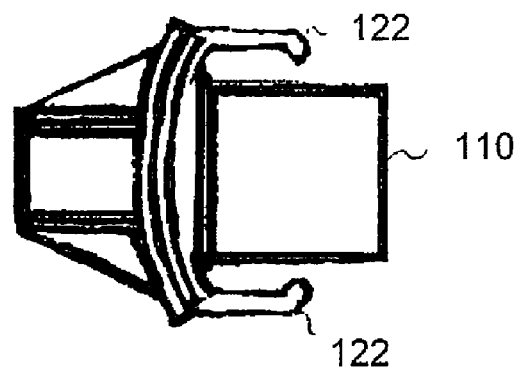
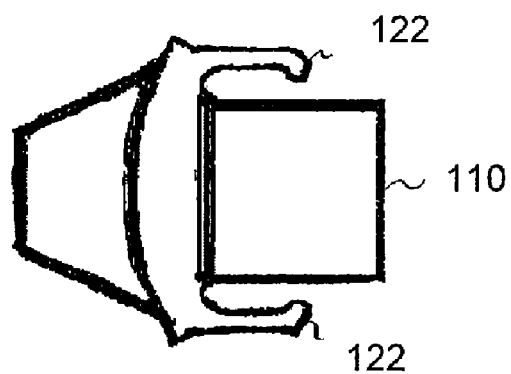

ANTENNA BREAKAWAY DEVICE FOR UTILITY PIT METER SYSTEM

FIELD OF THE INVENTION

The invention relates to a breakaway coupling device for antennas and antenna-related devices. More particularly, the invention describes a breakaway connector that provides overstress protection between radio-frequency antenna-related components of a condition-responsive-indicating system installed in a utility-meter pit environment.

BACKGROUND OF THE INVENTION

Utility meters, such as water meters, are often located in below-ground pits. This kind of meter-pit installation is commonly used in geographic regions that are not typically subjected to freezing conditions and in which a majority of homes are generally not constructed on full-slab foundations. Thus, there is no basement or access space for mounting a water meter within the home.

Automatic Meter Reading (AMR) systems generally include electronic components that require some use of cables and other connectors to link the various components of the system in a meter pit. For example, a meter located at the bottom of a pit may be connected to an encoder that converts consumption data collected by the meter to a signal that is then conveyed by cable to an antenna mounted on the lid at the top of the pit. The antenna transmits the meter data in the form of a radio frequency (RF) signal to other devices used to collect and record consumption data.

A common feature of AMR systems in meter pit environments is the attachment of antenna-related components to the lid of the meter pit. This arrangement, however, when combined with the use of cables within the pit, makes it possible for removal of the lid to break the connections between components in the antenna system. For example, when components are mounted to the pit lid and connected by cables to a utility meter at the bottom of the pit, the removal of the lid exerts tension on the cables. As the lid is moved farther away from the pit, as is likely to happen when the components are accessed by service personnel, the tension on the cables may increase to the point of breakage.

The risk of overstraining the cables is increased by the awkwardness of handling a meter-pit lid. Typical pit lids are made of cast iron and may be up to several inches thick. The entire lid can range from one to three feet in diameter. Thus, a pit lid may easily range from 22-90 lbs and its removal by several service personnel may result in sudden movements that put excessive strain on AMR system components.

One known connector currently used in these types of environments is disclosed in U.S. Pat. No. 6,162,082 to Karsten et al. While the Karsten et al. patent teaches an electrical connector for used in "wet" environments, the electrical connector suffers from the disadvantage of being permanently connected when assembled such that disassembly requires the use of a tool to fracture a locking component of the electrical connector. This locking component must then be replaced with a new locking component in order to complete the connection.

Another connector is disclosed in co-pending U.S. Pat. No. 7,033,193 to the assignees of the present invention. The disclosed electrical connector assembly includes a receptacle connector member and a plug connector member that interface to provide a dual radial seal substantially eliminating the possibility of moisture and water intrusion. When connected, the electrical connector comprises dual radial seals, one to prevent dirt and contaminant infiltration, the second to prevent moisture or water intrusion.

Although such connectors are designed to minimize certain problems presented by meter-pit environments, there remains a need for connectors that provide overstress protection for the cables and system components typically disposed in a meter pit.

SUMMARY OF THE INVENTION

The invention provides a breakaway coupling for use in a meter-pit environment that protects the connections between antenna-related components of an AMR system. Breakaway couplings are useful for protecting connections on which force is exerted. The breakaway device allows the pit lid to be removed without damage to the connector elements themselves or to the objects they connect, such as cables, cords, and the like. Such connectors separate safely before applied forces become destructive, unlike currently used connectors that resist separation without regard for the degree of force applied.

In one embodiment, an AMR system includes a cable operably connecting system components such as a utility meter, an AMR device, and an RF antenna. The breakaway coupling joins the cable to the AMR device, which is mounted on the lid. The breakaway coupling detaches the cable from the AMR device when force is applied that is less than the breaking strength of the cable.

Alternatively, the breakaway coupling joins the AMR device and the antenna. In this embodiment, the antenna is separate from the AMR device and mounted to the lid. When the lid is opened, the antenna breaks away from the AMR device when force is applied that is less than the breaking strength of the cable that connects the AMR device to the meter.

In another embodiment, the breakaway device includes a mounting member attached to the pit lid. An AMR device, such as an endpoint, is attached to the lid via the mounting member. A cable leads away from the AMR device into the pit toward the utility meter. When the lid is opened, the AMR device breaks away from the mounting member when force is applied that is less than the breaking strength of the cable.

In another embodiment shown in FIGS. 2 and 2A, the breakaway device is in the form of a lanyard attached to a coil of cable. In this configuration, the amount of cable is increased so a typical lid displacement will not exert excessive force on the cable. To keep the excess cable from taking up space in the meter pit, the cable is coiled and secured with a lanyard device. The lanyard device releases from the cable when force is applied that is less than the breaking strength of the cable.

The above summary of the various representative embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 3 shows a breakaway coupling and AMR unit according to the invention.

FIG. 4 shows top, side, and bottom views of a breakaway coupling according to the invention.

Figure 1:
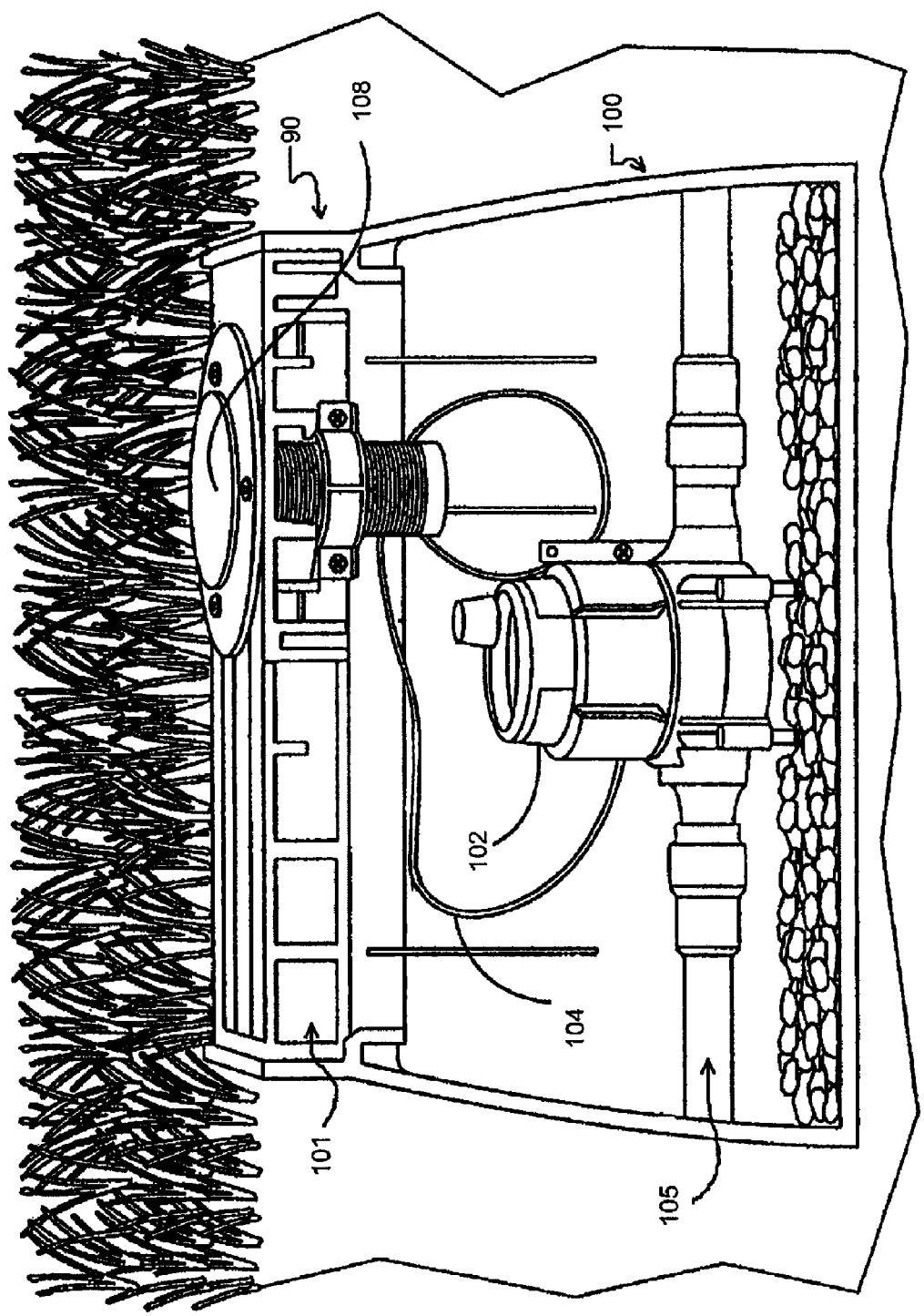
FIG. 1 shows a utility-meter pit configuration with the transmitter positioned outside the pit's lid.

While the invention is amenable to various modifications and alternative forms, specific examples shown in the drawings will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF PREFERRED EMBODIMENTS

A utility-meter pit allows access to below-ground meters used to measure consumption of water, gas, electricity, and the like. The pit is closed with a lid to protect the equipment inside. Components of AMR systems, such as an encoder, cables, radio-frequency (RF) transmitter, and the like can be positioned in the pit in variety of ways. For example, some components are ideally attached to the lid. An AMR device attached to a pit lid is positioned relatively far from the bottom of the pit. This configuration keeps the AMR device away from water and other contaminants that are likely to be present deeper in the pit. Further, when the AMR device includes an antenna for RF transmissions, the use of a lid-mount for the AMR device ensure that the antenna will be close to the exterior of the pit. The lid-mount may require that a hole be drilled in the lid so that an AMR device can be positioned through the lid and thus can transmit RF signals without the pit lid as an obstacle.

FIG. 1 shows an example of an AMR system configured for a water-meter pit. Water-meter-pit assembly 90 includes a pit 100 with a lid 101. Within pit 100 is a water meter 102 connected to a water pipe 105. Meter 102 is connected by a cable 104 to an AMR device 106 including a radio-frequency (RF) transmitter 108. As shown in FIG. 1, AMR device 106 is mounted to lid 101 so that RF transmitter 108 extends partially through lid 101. Alternatively, AMR device 106 can be mounted to lid 101 so that RF transmitter 108 does not extend through lid 101. AMR device 106 may include an encoder and an integral RF antenna. Alternatively, these components can be installed in separate housings and joined with a cable or other connector.

Figure 2:
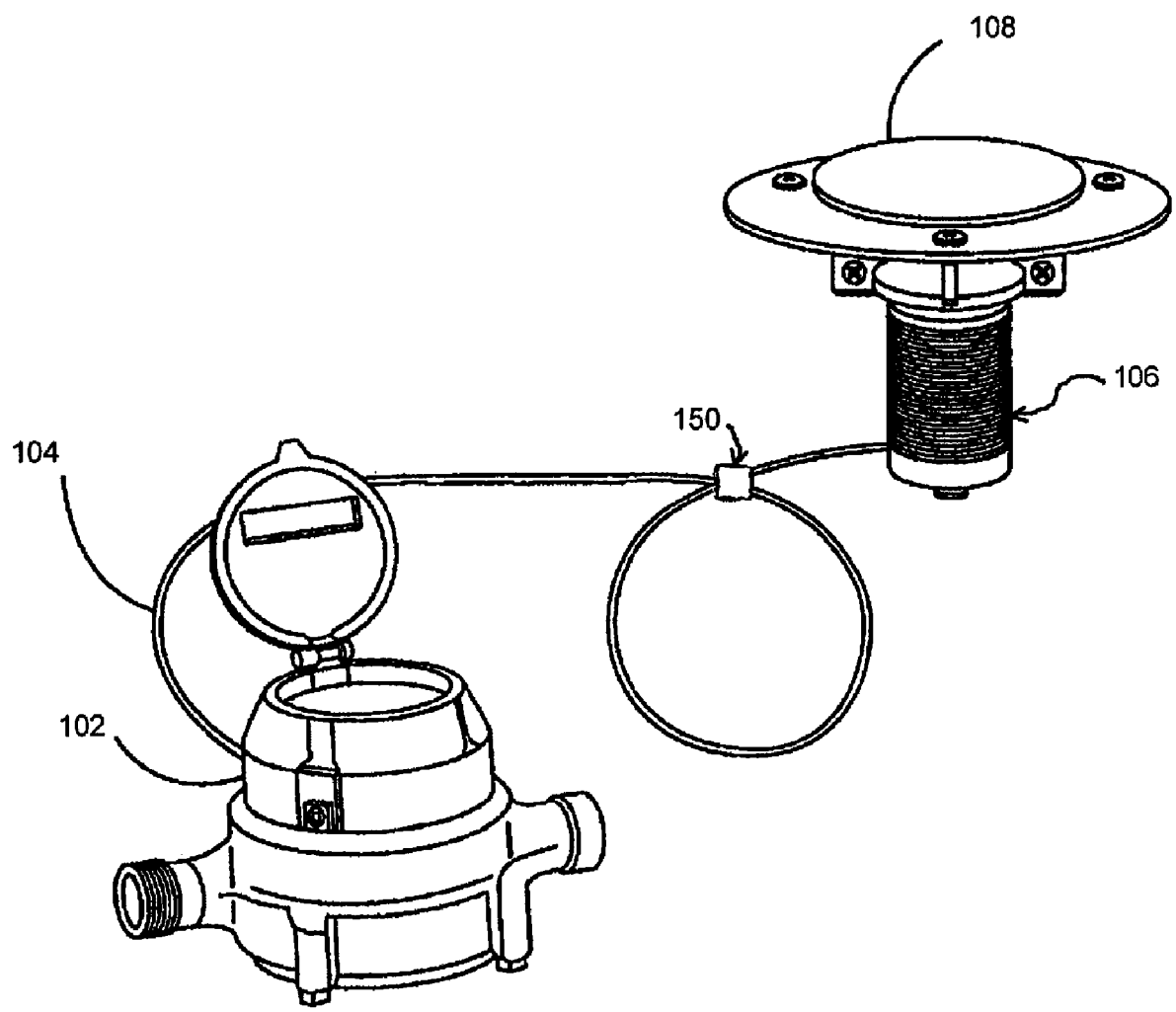
FIG. 2 shows components of an Automatic Meter Reading (AMR) system.

FIG. 2 shows the components of an AMR system for a water meter outside of the pit environment. Water meter 102 is connected by cable 104 to AMR device 106, which includes RF transmitter 108. AMR device 106 is only one of many kinds of such devices that may be used. For example, FIG. 3 shows an AMR device 106 with an integral RF antenna.

A breakaway coupling 110 of the invention protects cable 104 from damage when lid 101 is removed. Cable 104 has a linear breaking strength generally in the range of 30-50 lbs. measured as a direct axial pull, or the equivalent of such a force in an indirect pull that may include a shearing force. In the embodiment shown in FIG. 3, AMR device 106 includes at least one mounting hole 107 for attaching the device to a pit lid. Coupling 110 has a first engagement portion 122 that engages a corresponding second engagement portion 132 of a corresponding second engagement portion 130 of AMR device 106. Coupling 110 is connected to cable 104 (not shown) and AMR device 106 is attached to lid 101 (not shown). The force required to disconnect coupling 110 is less than the linear breaking strength of cable 104. Within this limit, the amount of force required to disconnect coupling 110 may vary, for example, in the range of 5-10 lbs., depending on the shape of first and second engagement portions 122, 132 and the material used for their construction.

FIG. 4 shows detailed top, side, and bottom views of coupling 110. Coupling 110, however, may have other shapes as well. Whatever the shape is used for coupling 110, it must allow for coupling 110 to be connected to AMR device 106 under the weight of cable 104 yet be detachable from AMR device 106 when subjected to a force that is less than the breaking strength of cable 104.

Figure 5:
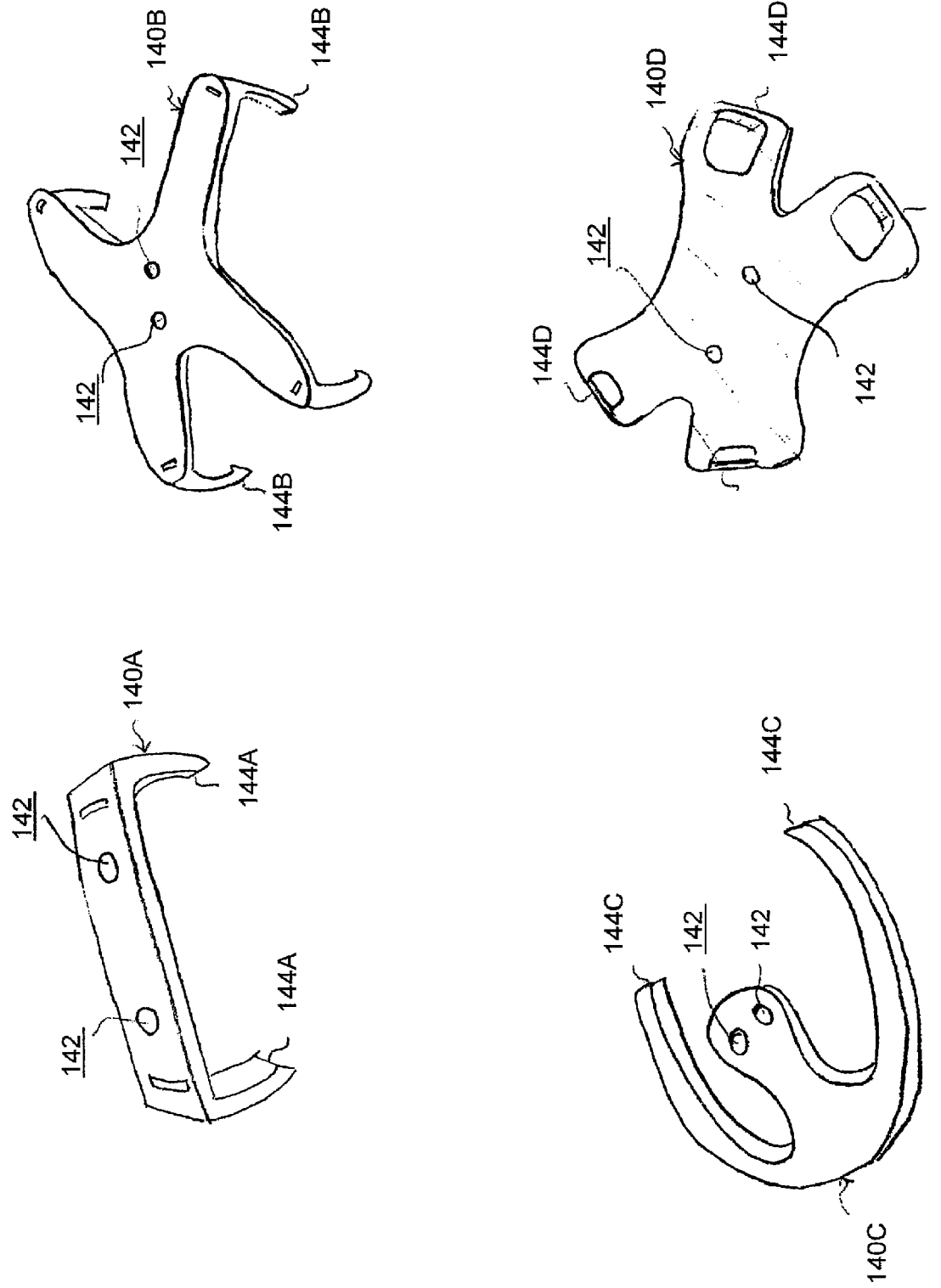
FIG. 5 shows alternative configurations for a breakaway mounting unit.

Another embodiment of a breakaway coupling for use in a pit environment is shown in FIG. 5. Breakaway mount 140A, 140B, 140C, and 140D illustrate alternative shapes for a mounting plate for AMR device 106 attached to cable 104 (not shown). Each mounting-plate configuration 140 includes engagement members 144 sized to allow AMR device 106 to be attached to mounting plate 140 and then removed when subjected to a force that is less than the breaking strength of cable 104.

Figure 6B:
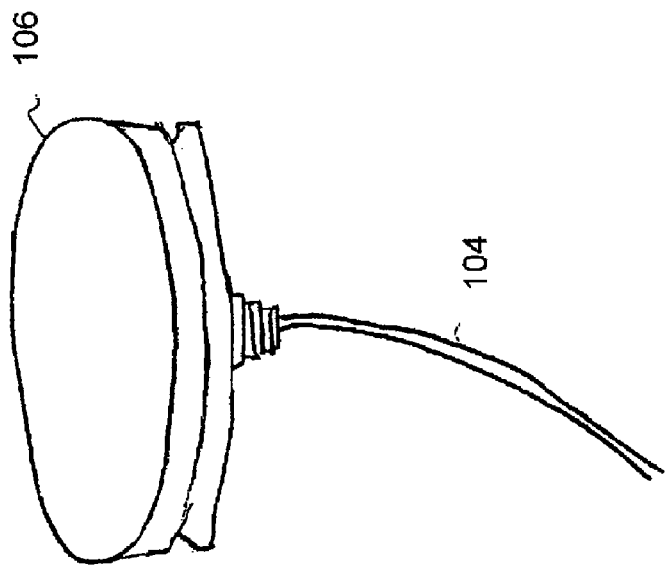
FIG. 6B shows a perspective view of the AMR device of FIG. 6A disengaged from the breakaway mounting unit.
Figure 6A:
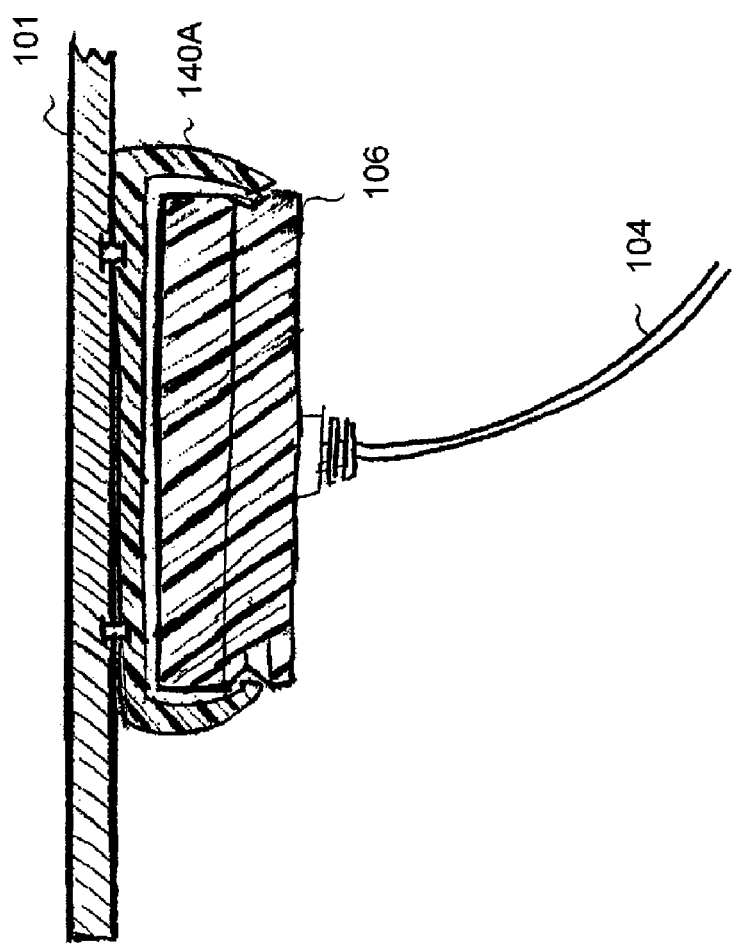
FIG. 6A shows a cross-section of an AMR device engaged with a breakaway mounting unit.

The use of breakaway mounts 140 A-D is shown in FIG. 6A. Such mounts may be used to attach an AMR device 106, such as a utility-meter endpoint, to a pit lid. A cross-section of breakaway mount 140A attached to lid 101 is shown in FIG. 6A. In this embodiment, AMR device 106 breaks away from mount 140A when lid 101 is removed. The force required to detach AMR device from mount 140A is less than the linear breaking strength of cable 104. FIG. 6B shows a perspective view of AMR device 106 detached from breakaway mount 140A.

Figure 2A:
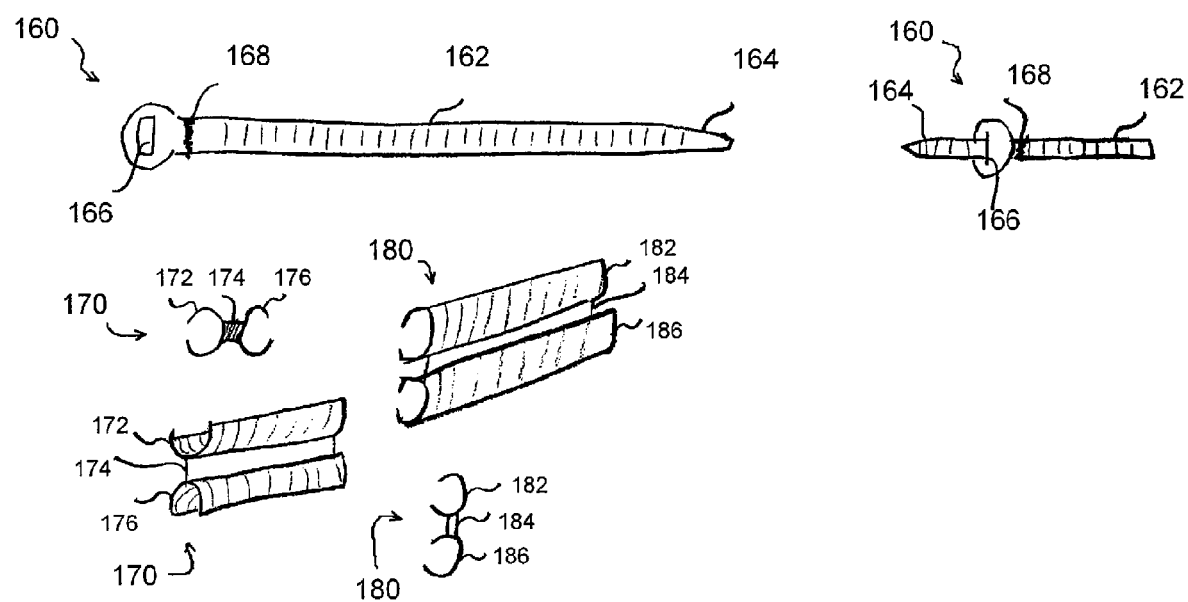
FIG. 2A shows different designs for the lanyard-style breakaway device of the invention.

Another embodiment of a breakaway device for protecting cable 104 is shown in FIG. 2. Lanyard 150 is attached to a coil of cable 104 such that when force is applied to cable 104 upon removal of lid 101 (not shown), lanyard 150 is released and the full length of cable 104 may be extended. The force applied to cable 104 by raising lid 101 is thus less likely to break cable 104 because of the additional length of cable available before the lid's removal will exert forces comparable to the breaking strength of cable 104 the breaking strength of the connecting hardware used to attach meter 102 and AMR device 106 to cable 104. Lanyard 150 may be of one or more pieces; examples of such designs are shown in FIG. 2A. Device 160 includes a first portion 162, an insertion tip portion 164, a slot 166, and a breakaway portion 168. Insert tip portion 164 is placed into slot 166, forming a circular member for securing a coil of cable (not shown). When sufficient force is exerted on the cable, breakaway portion 168 separates and the coil of cable is freely extendible. Device 170 includes a first member 172 joined by a middle portion 174 and a second member 176. In use, a coil of cable (not shown) is releasably inserted into first member 172 and second member 176. For example, an incoming portion of a coil of cable may be inserted into first member 172 and an outgoing portion of cable may be inserted into second member 176. Device 180, including a first member 182 joined by a middle portion 184 and a second member 186, is a variation of device 170. Other releasable devices suitable for releasably securing coils of rope, cable, or other materials can also be used.

In the embodiments described above, the connections between system components have some protection from contamination, such as exposure to water and humidity. In embodiments where the coupling is integrated with a housing of an AMR device or an antenna, the coupling may be hermetically sealed from contaminants. In the embodiments where a device, such as a lanyard, is used to releasably secure a coil of cable, the device may be positioned apart from a system component (somewhere between the lid and the bottom of the pit) because the device does not require a break in the cable and thus does not require a seal or housing in the vicinity of the breakaway device.

In all embodiments, the force required to decouple coupling 110 or release lanyard 150 is less than the linear breaking strength of the cable. This decoupling or releasing force may also be less than the degree of force sustainable by the cable before the cable suffers damage that causes its performance to deteriorate.

Although various embodiments of the invention have been disclosed here for purposes of illustration, it should be understood that a variety of changes, modifications and substitutions may be incorporated without departing from either the spirit or scope of the invention.

What is claimed:

1. A breakaway device for an AMR system positioned in a pit having a lid and containing a utility meter, the breakaway device comprising:
    an AMR device for receiving consumption data from the utility meter;
    a mounting member attached to the lid for securing the AMR device;
    a least one length of cable, the cable having a linear breaking strength, the at least one length of the cable operably coupled to the AMR device and providing communicative connection between the utility meter and the AMR device, the mounting member and the AMR device being decoupleable in response to a force that is less than the linear breaking strength of the cable.

2. The breakaway device of claim 1, wherein the AMR device comprises an antenna.

3. The breakaway device of claim 1, wherein the breaking strength of the cable is between 30 and 50 lbs and the force required to disengage the AMR device from the mounting member is between 5 and 10 lbs.

4. The breakaway device of claim 1, wherein the force required to disengage the AMR device from the mounting member is less than 50% of the breaking strength of the cable.

5. The breakaway device of claim 1, wherein the force required to disengage the AMR device from the mounting member is between 10% and 30% of the breaking strength of the cable.

6. A breakaway apparatus for an AMR system positioned in a pit having a lid, the AMR system including at least a first portion operably coupled to the lid and a second portion positioned below the lid in the pit, the breakaway coupling apparatus comprising:
    a least one length of cable, the cable having a linear breaking strength, the at least one length of the cable operably connected to the first and second portions of the AMR system, the length of the cable being equal to at least about twice the distance from the first position to the second position of the AMR system;
    a first coupling member for securing a portion of the length of cable in a generally coiled configuration, the first coupling member being decoupleable to release the portion of the length of the cable in the generally coiled configuration in response to a force that is less than the linear breaking strength of the cable.

7. The breakaway coupling of claim 6, wherein the coupling member is a lanyard.

8. The breakaway coupling of claim 6, wherein the breaking strength of the cable is between 30 and 50 lbs and the force required to disengage the first and second connector elements is between 5 and 10 lbs.

9. The breakaway coupling of claim 6, wherein the force required to disengage the first and second connector element is less than 50% of the breaking strength of the cable.

10. The breakaway coupling of claim 6, wherein the force required to disengage the first and second connector element is between 10% and 30% of the breaking strength of the cable.

* * * * *